H. R. MITCHELL.
BATTERY TERMINAL.
APPLICATION FILED MAY 29, 1922.

1,438,454.

Patented Dec. 12, 1922.

Inventor
Harry R. Mitchell

Patented Dec. 12, 1922.

1,438,454

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

BATTERY TERMINAL.

Application filed May 29, 1922. Serial No. 564,398.

*To all whom it may concern:*

Be it known that I, HARRY R. MITCHELL, a citizen of the United States of America, and resident of the city of Seattle, in the county of King and State of Washington, have invented certain new and useful Improvements in Battery Terminals, of which the following is a specification.

My invention relates to storage battery terminals and has for its principal object the provision of means whereby raveling out of the insulation adjacent the end of the tapered plug may be largely prevented, and if raveling out should begin, to protect this end of the insulation against further raveling.

My invention comprises those novel parts and combinations thereof which are shown in the accompanying drawings, described in the specification and particularly defined by the claim terminating the same.

In the accompanying drawings I have shown my invention in the form which is now preferred by me.

Figure 1:
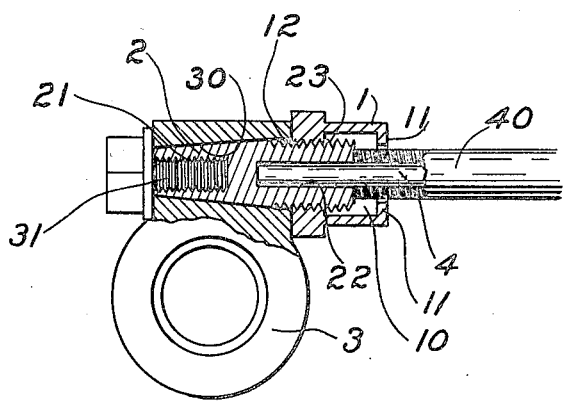
Figure 1 is a section through the complete assembled battery terminal.

Connectors employing a ring 3 which is adapted to be suitably secured to the post of a storage battery and having a tapered socket 30 for the reception of a tapered plug 2 are common in the art. This portion of the terminal forms no part of my invention, and while I have shown it to illustrate the application of my invention, it will be apparent that any suitable form of connector may be employed. Such terminals commonly employ a screw 31 threading within a bore 21 in the end of the plug 2 to draw the tapered plug into the socket 30 and thus to form a tight electrical connection between the plug and its circuit; this likewise forms no part of my invention.

In such terminals a wire conductor 4, covered with a sheet of insulation 40, is secured within a bore 22 at the opposite end of the plug 2 from the bore 21. The insulation 40 is cut away from the end of the conductor 4 and its end lies adjacent the end of the plug 2 which contains the bore 22. Ordinarily where this end of the insulation is left unprotected it will in a short time ravel out and leave the conductor exposed. This will permit acid fumes to attack the conductor itself, and further, if left alone the insulation will ravel out farther along the conductor and short circuiting may occur. It is to prevent the possibility of such occurrences that my present invention is particularly intended.

The end of the plug 2 which receives the conductor 4 is long enough to project from its socket 30, and this end is threaded as shown at 23. Upon this threaded end is secured a sleeve 1 threaded as indicated at 12. If desired other suitable means of securing the sleeve 1 upon the plug 2 may be employed, although the arrangement shown is simple and inexpensive. The free end of the sleeve 1 extends beyond the threaded end of the plug 2 and beyond the end of the insulation 40 which is adjacent thereto. Preferably the sleeve does not touch the insulation normally. Its end may be flanged inward as indicated at 11 to lie more closely adjacent the insulation 40 and to prevent its withdrawal from the insulated conductor, but preferably this flanged end still does not touch the insulation when the conductor is in axial alinement with the plug 2. A chamber 10 is thus formed between the sleeve 1, its flange 11, and the end of the plug 2.

Figure 2:
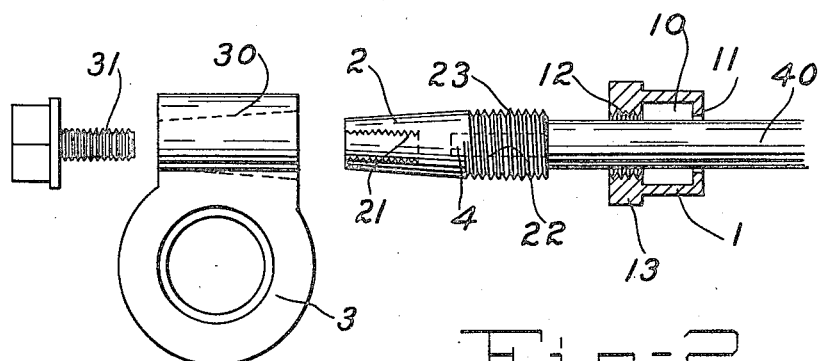
Figure 2 is an elevation of the same parts, shown disassembled, one part being shown in section.
Figure 3:
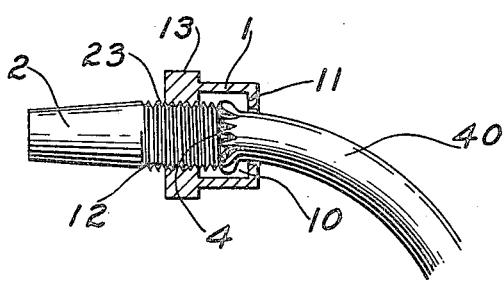
Figure 3 is a part section and part elevation through an end of the wire conductor and the plug and sleeve connected thereto.

In the chamber 10 lies the end of the insulation 40 with nothing to touch it or to disturb it or to draw it away from the end of the plug 2. The conductor 4 is free to bend somewhat as is shown in Figure 3 and yet there is no contact between the insulation and the sleeve such as would tend to withdraw the insulation from the conductor or from the end of the plug 2. Thus, unless the sleeve is withdrawn from the threads 23 as is shown in Figure 2, the insulation can not be disturbed and will not ravel. Mere withdrawal of the sleeve will not affect the insulation as the two do not touch, but if the sleeve is left unattached to the plug 2, or if it is repeatedly withdrawn therefrom, careless handling of the conductor may cause raveling of its insulation 40. If the insulation has begun to ravel, as has been indicated in Figure 3, the ravelings will merely tend to fill the chamber 10 and will not ordinarily extend outside of this chamber, particularly as the flange 11 lies close to the insulation. To prevent the sleeve coming off of the threads 23, its end adjacent the socket 30 may be screwed up to contact with the connector. A portion 13 of its outer surface may be formed of a shape to be engaged by a wrench for this purpose.

Another advantage inherent in the structure as above described is that the sleeve may be utilized as a means for dislodging the plug from the connector when desired. It is a well known fact that after the plugs have been wedged forcibly into the sockets by screws 31 it is difficult to dislodge them. It is often the case that a battery is badly damaged because the person seeking to disconnect a terminal hammers upon the head of screw 31 after slightly loosening it. Usually this results in driving the plug out of the socket but sometimes it breaks the whole connector off and nearly always results in battering up the head of the screw.

With this connector it is only necessary to loosen screw 31 and screw up sleeve 1 against the rear end of the connector to loosen the plug by the powerful drawing action of the screw threads and this without any hammering upon the plug.

What I claim as my invention is:

In combination an internally tapered, socketed connector and a cylindrical element the latter being tapered to form a plug and internally threaded at its front end and externally threaded and internally socketed at its rear end, a drawing element threaded thereinto for engaging one end of the connector to draw said plug to a seating therein, a sleeve threaded upon said externally threaded portion of the element and extending beyond the rear end thereof and an insulated conductor having a bare end engaged with the socketed end of the element that portion of the conductor adjacent the rear end of the element being received and housed in the extending portion of the sleeve, the threads upon the element extending far enough therealong to permit of the forward end of the sleeve being screwed into engagement with the rear end of the socketed connector.

Signed at Seattle, King County, Washington, this 17th day of May, 1922.

HARRY R. MITCHELL.